United States Patent
Rozman et al.

(10) Patent No.: US 10,075,106 B2
(45) Date of Patent: Sep. 11, 2018

(54) DC SYNCHRONOUS MACHINE

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/683,468

(22) Filed: Apr. 10, 2015

(65) Prior Publication Data
US 2016/0301333 A1    Oct. 13, 2016

(51) Int. Cl.
| | |
|---|---|
| *H02P 9/02* | (2006.01) |
| *H02K 1/24* | (2006.01) |
| *H02P 6/00* | (2016.01) |
| *H02K 19/36* | (2006.01) |
| *H02P 9/14* | (2006.01) |
| *H02P 9/30* | (2006.01) |
| *H02P 101/30* | (2015.01) |

(52) U.S. Cl.
CPC ........... *H02P 6/002* (2013.01); *H02K 19/365* (2013.01); *H02P 9/14* (2013.01); *H02P 9/30* (2013.01); *H02P 2101/30* (2015.01)

(58) Field of Classification Search
CPC ........... H02K 3/28; H02K 11/048; H02K 9/06
See application file for complete search history.

(56) References Cited

U.S. PATENT DOCUMENTS

| | | | | |
|---|---|---|---|---|
| 4,024,455 A | * | 5/1977 | Yarrow | H02M 1/22 310/129 |
| 4,035,712 A | * | 7/1977 | Yarrow | H02P 9/42 310/160 |
| 4,625,160 A | * | 11/1986 | Hucker | H02K 3/16 310/115 |
| 6,586,914 B2 | | 7/2003 | Garrigan et al. | |

(Continued)

FOREIGN PATENT DOCUMENTS

| | | |
|---|---|---|
| JP | 2008072886 | 3/2008 |
| JP | 2009017763 | 1/2009 |
| WO | 00/67355 | 11/2000 |

OTHER PUBLICATIONS

European Search Report for European Patent Application No. 16164378 completed Jul. 29, 2016.

*Primary Examiner* — Bickey Dhakal
*Assistant Examiner* — Charles S Laughlin
(74) *Attorney, Agent, or Firm* — Carlson, Gaskey & Olds, P.C.

(57) ABSTRACT

An assembly for a direct current (DC) synchronous machine, according to an exemplary aspect of the present disclosure includes, among other things, a stationary portion including a direct current (DC) armature winding and a rotating portion including alternating current (AC) field winding configured to supply DC output to the DC armature winding. A rotating inverter is configured to selectively communicate current to the AC field winding such that a frequency of the current is adjusted to approach synchronization with a position of the rotating portion. A method for generating DC output from a DC synchronous machine is also disclosed.

15 Claims, 5 Drawing Sheets

(56) References Cited

U.S. PATENT DOCUMENTS

| | | | |
|---|---|---|---|
| 6,844,707 B1 * | 1/2005 | Raad | F02N 11/04 |
| | | | 290/46 |
| 6,870,350 B2 | 3/2005 | Garrigan et al. | |
| 7,102,323 B2 | 9/2006 | Zhou et al. | |
| 7,388,300 B2 * | 6/2008 | Anghel | F01D 15/10 |
| | | | 290/31 |
| 7,821,145 B2 | 10/2010 | Huang et al. | |
| 8,148,886 B2 | 4/2012 | Sakata et al. | |
| 2004/0070373 A1 | 4/2004 | Nelson et al. | |
| 2005/0162030 A1 * | 7/2005 | Shah | H02K 19/26 |
| | | | 310/165 |
| 2006/0038517 A1 * | 2/2006 | MacKay | H02P 6/182 |
| | | | 318/685 |
| 2008/0303280 A1 * | 12/2008 | Xu | H02P 9/302 |
| | | | 290/31 |
| 2010/0117569 A1 * | 5/2010 | Trainer | H02P 9/00 |
| | | | 318/400.3 |
| 2010/0148712 A1 | 6/2010 | Klatt | |
| 2014/0042953 A1 * | 2/2014 | Sul | B60L 11/1803 |
| | | | 318/718 |
| 2014/0266078 A1 | 9/2014 | Rozman et al. | |
| 2014/0266079 A1 | 9/2014 | Rozman et al. | |
| 2014/0285053 A1 | 9/2014 | Himmelmann | |

* cited by examiner

DC SYNCHRONOUS MACHINE

BACKGROUND

This disclosure relates generally to power generation, and more specifically to a direct current (DC) synchronous machine.

Synchronous machines are known. Synchronous machines include a stationary portion and a rotating portion, where the rotating portion and the stationary portion each have at least one winding.

One application of synchronous machines is a starter/generator application for a gas turbine engine. Synchronous starter/generators are configured to function as a motor to first start the gas turbine engine. Once the engine is running, the synchronous starter/generator system can operate as a generator.

Some synchronous machines utilize a rotating DC field winding and a three-phase stator armature winding. When operating as a motor, the synchronous machine is coupled to an alternative current (AC) power source in order to supply motive power to a device with moving parts, such as the starter function or a pump or compressor. When operating as a generator, the synchronous machine is configured to supply AC current to one or more loads such as avionics equipment or motor driven loads on an aircraft. When DC output is required, the output voltage from the synchronous machine is rectified at the three-phase stator armature winding to produce direct current. There are challenges associated with current harmonics that adversely affect the generator efficiency, large volumetric and power density, and thermal losses on such rectifiers.

SUMMARY

A synchronous machine, according to an exemplary aspect of the present disclosure, includes, among other things, a direct current (DC) armature winding and a rotating portion including a rotating inverter coupled to an alternating current (AC) field winding. The AC field winding is separated from the DC armature winding to define an air gap. The rotating inverter is configured to communicate current to the AC field winding such that a frequency of the current is adjusted to approach synchronization with a position of the rotating portion. A method for generating DC output from a synchronous machine is also disclosed.

The various features and advantages of disclosed embodiments will become apparent to those skilled in the art from the following detailed description. The drawings that accompany the detailed description can be briefly described as follows.

DETAILED DESCRIPTION

The disclosed embodiments of a synchronous machine include a rotating inverter to provide stable DC output. The DC synchronous machine can be configured using various energy sources and various field winding configurations as discussed below. While the disclosed embodiments are primarily discussed as DC generators, it should be noted that the general configuration can function in both motor and generator modes.

Figure 1:
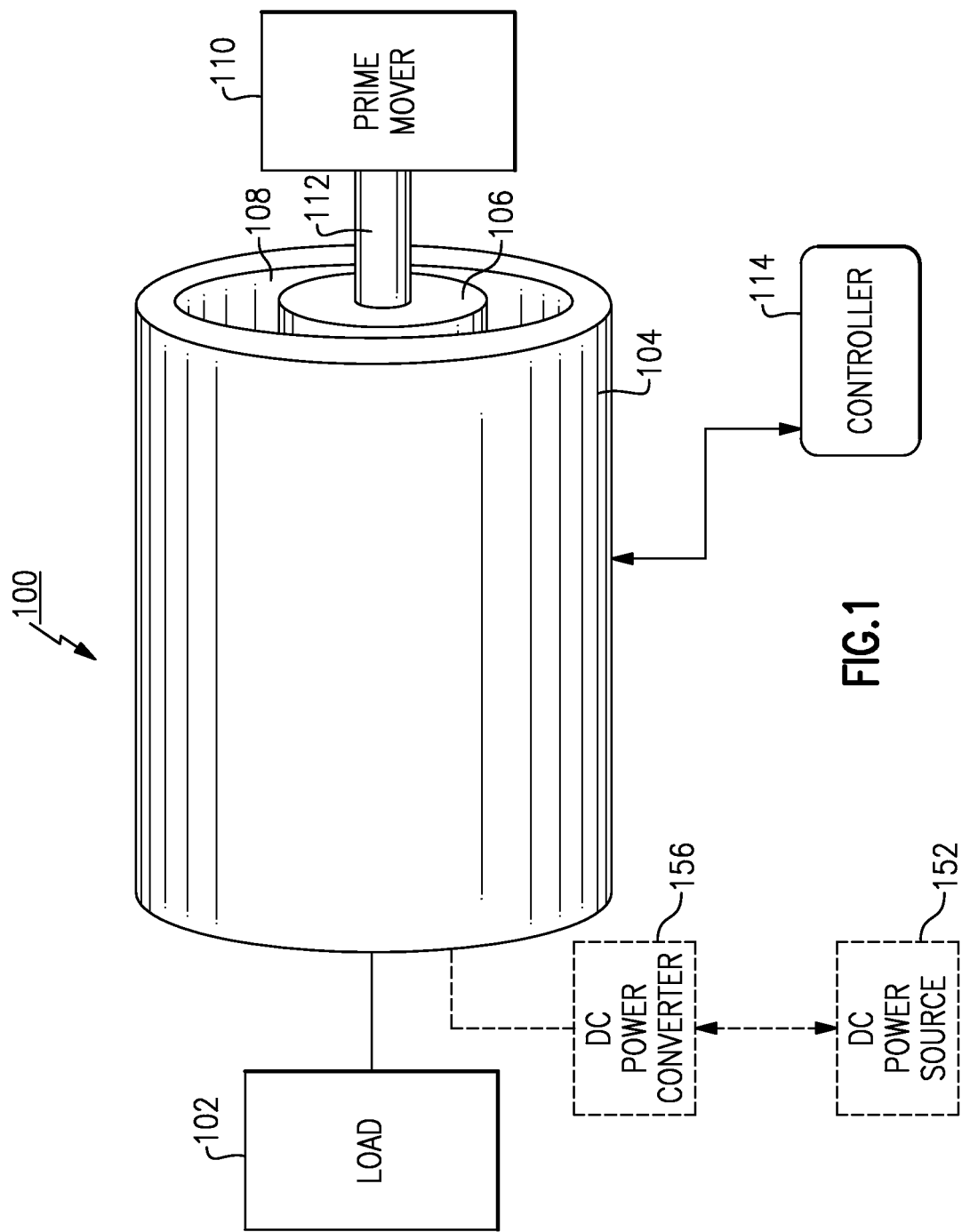
FIG. 1 illustrates a DC synchronous machine.

FIG. 1 illustrates a DC synchronous machine 100 configured to provide DC supply to one or more loads 102. In this disclosure, like reference numerals designate like elements where appropriate and reference numerals with the addition of one-hundred or multiples thereof designate modified elements that are understood to incorporate the same features and benefits of the corresponding original elements.

The DC synchronous machine 100 includes a stationary portion 104, or stator, arranged about a rotating portion 106, or rotor, to define an air gap 108. The rotating portion 106 can be coupled to a prime mover 110 via a shaft 112. Example prime movers 110 can include gas turbine engines for aircrafts and ground-based systems using diesel engines. The rotating portion 106 and the stationary portion 104 include wire coils. During operation in a generator mode, a rotating magnetic field is generated by supplying current to the wire coils at the rotating portion 106 while the rotating portion rotates relative to the stationary portion 104.

A controller 114 is coupled to the DC synchronous machine 100 to cause various characteristics of the rotating magnetic field to be adjusted, as discussed in detail below. The DC synchronous machine 100 can be coupled to a DC-DC power converter 156 powered by a power source 152 in order to generate mechanical output in a motor mode to drive the prime mover 110. The DC synchronous machine 100 can also be configured to function in a generator mode to supply direct current constant voltage to one or more loads 102. Controller 114 is configured to receive a load voltage feedback signal and communicate a current magnitude command to the current regulator 138 in response to the load voltage feedback signal to maintain load voltage at a pre-determined level or range. As an example, the DC synchronous machine 100 can be a starter/generator which operates to start rotation of a gas turbine engine, and then is driven by the gas turbine engine to generate current.

Figure 2:
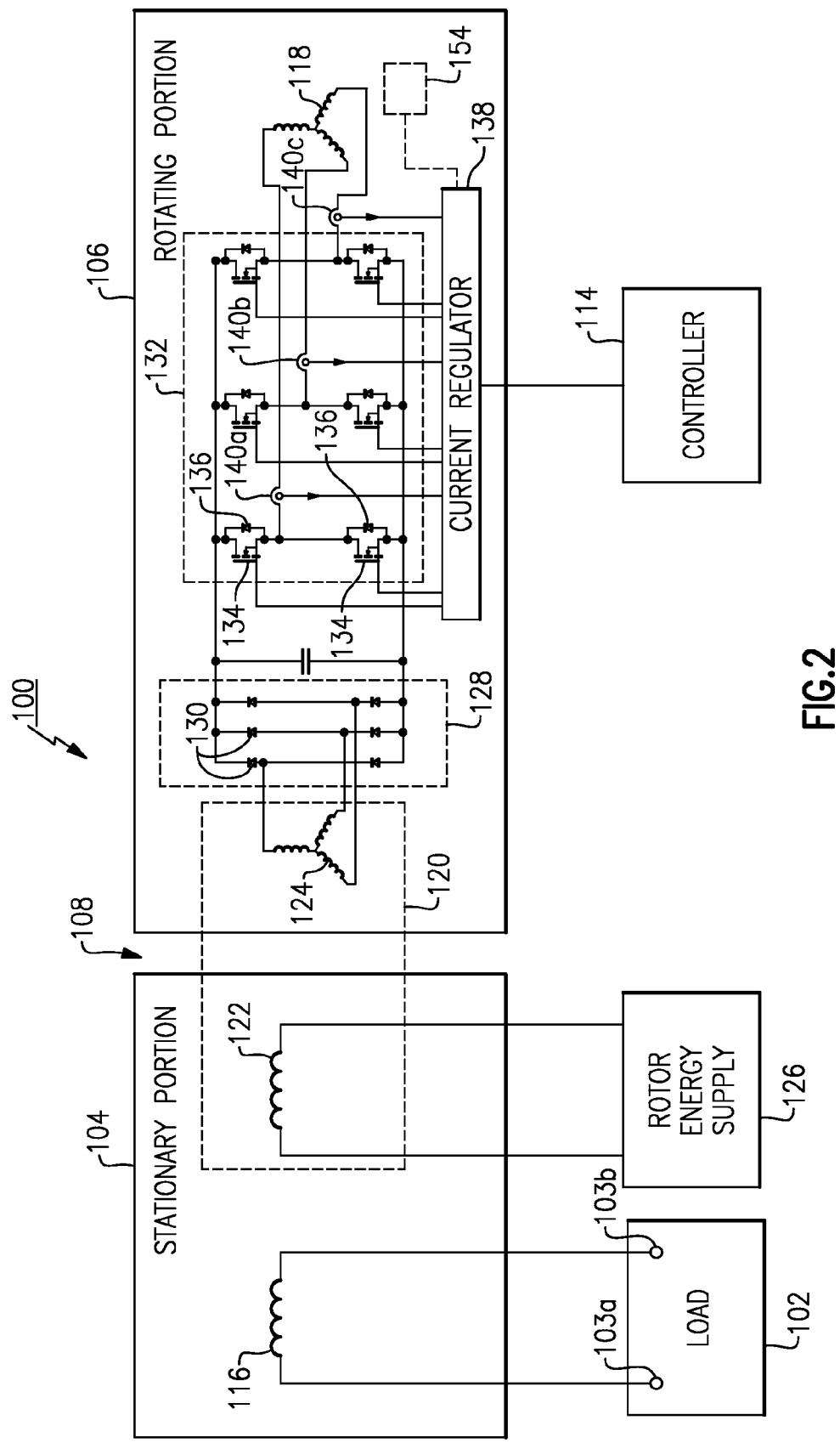
FIG. 2 schematically illustrates selected portions of the DC synchronous machine of FIG. 1.

Referring to FIG. 2, the DC synchronous machine 100 can be configured to generate a rotating magnetic field based on a supply of three-phase alternating current (AC). The stationary portion 104 includes a stator armature winding 116, and the rotating portion 106 includes AC field winding 118. Energy is supplied to the rotating portion 106 by a rotor energy source 120. In the illustrative embodiment, the rotor energy source 120 is a synchronous exciter including exciter field winding 122 located at the stationary portion 104 and an exciter armature winding 124 located at the rotating portion 106. A rotor energy supply 126 is coupled to the exciter field winding 122 and is configured to selectively energize the exciter field winding 122. Energy is transferred across the air gap 108 from the exciter field winding 122 to induce alternating current in the exciter armature winding 124. In alternative embodiments, the rotor energy source 120 is a permanent magnet exciter configured to transfer energy across the air gap 108.

A supply of alternating current from the exciter armature winding 124 is communicated to a rotating inverter 132 through a rotating rectifier 128. The rotating rectifier 128 can include one or more diodes 130 configured to rectify the AC supply to a DC supply.

The rotating inverter 132 can include a three-phrase bridge including transistor(s) 134 and diode(s) 136 configured to invert the direct current to alternating current, and to selectively provide alternating current to the AC field winding 118. AC supply to the AC field winding 118 generates a rotating magnetic field between the AC field winding 118 and stator armature winding 116. The rotating magnetic field induces a current in the stator armature winding 116 to generate DC output at terminals 103a, 103b.

The rotating portion 106 includes a current regulator 138 configured to selectively adjust a frequency, a phase and/or a current magnitude of current communicated from the rotating inverter 132 to the AC field winding 118. The current regulator 138 can be coupled to the gate of one or more transistor(s) 134 to selectively adjust the current output supplied from the rotating inverter 132 to the AC field winding 118.

The controller 114 is coupled to the current regulator 138 and is configured to cause the current regulator 138 to selectively adjust current supplied from the rotating inverter 132 to the AC field winding 118 such that the frequency of the current supplied is synchronized with a position of the rotating portion 106, shaft 112, or the rotating magnetic field relative to the stationary portion 104 by use of a position sensor 154, for example. Synchronization refers to adjusting current supplied to each phase of a field winding to cause the wave cycles per second (frequency, Hz) of the current at each phase to be equivalent to the revolutions per second (angular frequency, ω) of a rotor.

Various techniques for determining the relative position of the rotating portion 106 can be utilized. In some embodiments, the current regulator 138 is configured to utilize one or more position sensors 154, such as resolver and Hall effect devices, to selectively adjust current based on rotor position. Further ways for determining a rotor position and synchronizing a frequency of a supply current with a rotor position are disclosed in co-pending U.S. patent application Ser. No. 14/685,879, entitled "Sensorless Control of a DC Synchronous Machine" filed on even date herewith. Aspects of this function from the co-pending application are incorporated herein by reference.

The current regulator 138 can be coupled to one or more current sensors 140 to determine the current output at each phase of the rotating inverter 132. The current regulator 138 is configured to selectively adjust the current supply to the rotating inverter 132 based on the current measurements at each sensor 140a, 140b, 140c of the rotating inverter 132, and position information from the position sensor 154, for example.

By arranging the rotating inverter 132 in the rotating portion 106, the overall system can take advantage of the amplification effect that occurs when power is transferred across the air gap 108 from the AC field winding 118 to the stator armature winding 116, providing similar output voltage as arrangements having a high power rectifier at the stationary portion. Thus, generator efficiency can be improved by reducing high power electronic and thermal management requirements.

Figure 3:
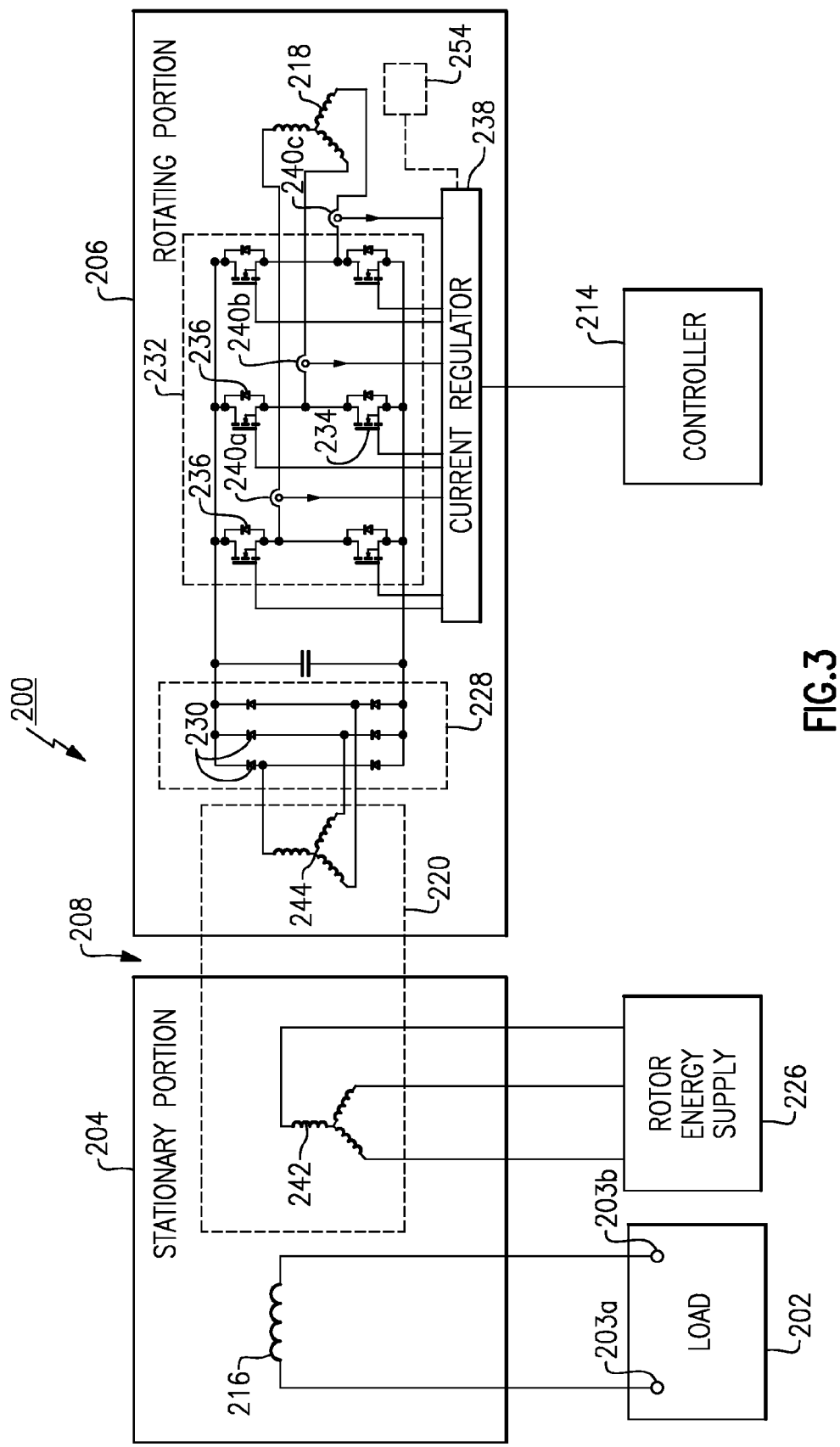
FIG. 3 schematically illustrates a second embodiment of a DC synchronous machine.

FIG. 3 schematically illustrates a second embodiment of a DC synchronous machine 200. In this embodiment, the rotor energy source 220 is a high frequency transformer including a primary winding 242 located at a stationary part 204 and a secondary winding 244 located at a rotating portion 206. A rotor energy supply 226 coupled to the primary winding 242 is configured to supply current to and energize the primary winding 242. Energy is transferred across the air gap 208 from the primary winding 242 to induce alternating current in the secondary winding 244. AC supply from the secondary winding 244 is communicated to the rotating inverter 232 through a rotating rectifier 228.

Figure 4:
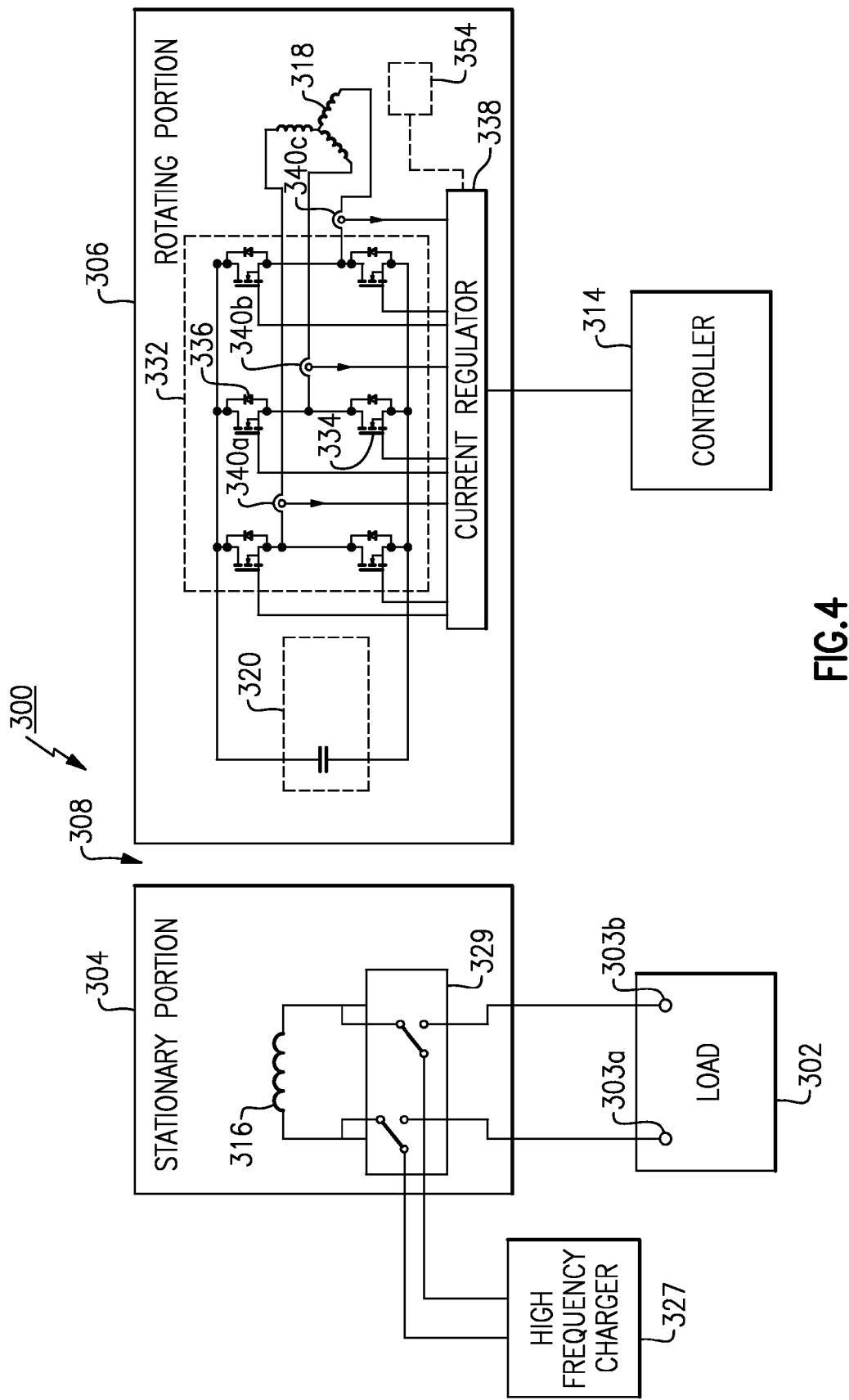
FIG. 4 schematically illustrates a third embodiment of a DC synchronous machine.

FIG. 4 schematically illustrates a third embodiment of a DC synchronous machine 300. In this embodiment, the rotor energy source 320 is a rechargeable energy source, such as a supercapacitor (shown) or lithium ion battery, located in the rotating portion 306. An output contactor 329 is coupled to the stator armature winding 316 and is configured to cause the DC synchronous machine 300 to operate in charge and supply modes. The mode selection is initiated by the controller 314 based on a state of charge of the rechargeable energy source. During supply mode, power will flow from the rechargeable rotor energy source 320 to a rotating inverter 332. During charge mode, power is supplied to the stator armature winding 316 from a high frequency charger 327. The high frequency voltage induced in the rotating AC field winding 318 is rectified by the rotating inverter 332 which operates as a six-pulse rectifier by turning off transistors, or as an active rectifier and reversing the power flow to the rotating re-chargeable energy source 320. The rate of charge current to the rotor energy source 320 can be controlled by the high frequency charger 327 or by the rotating inverter 332 operating as an active rectifier.

Figure 5:
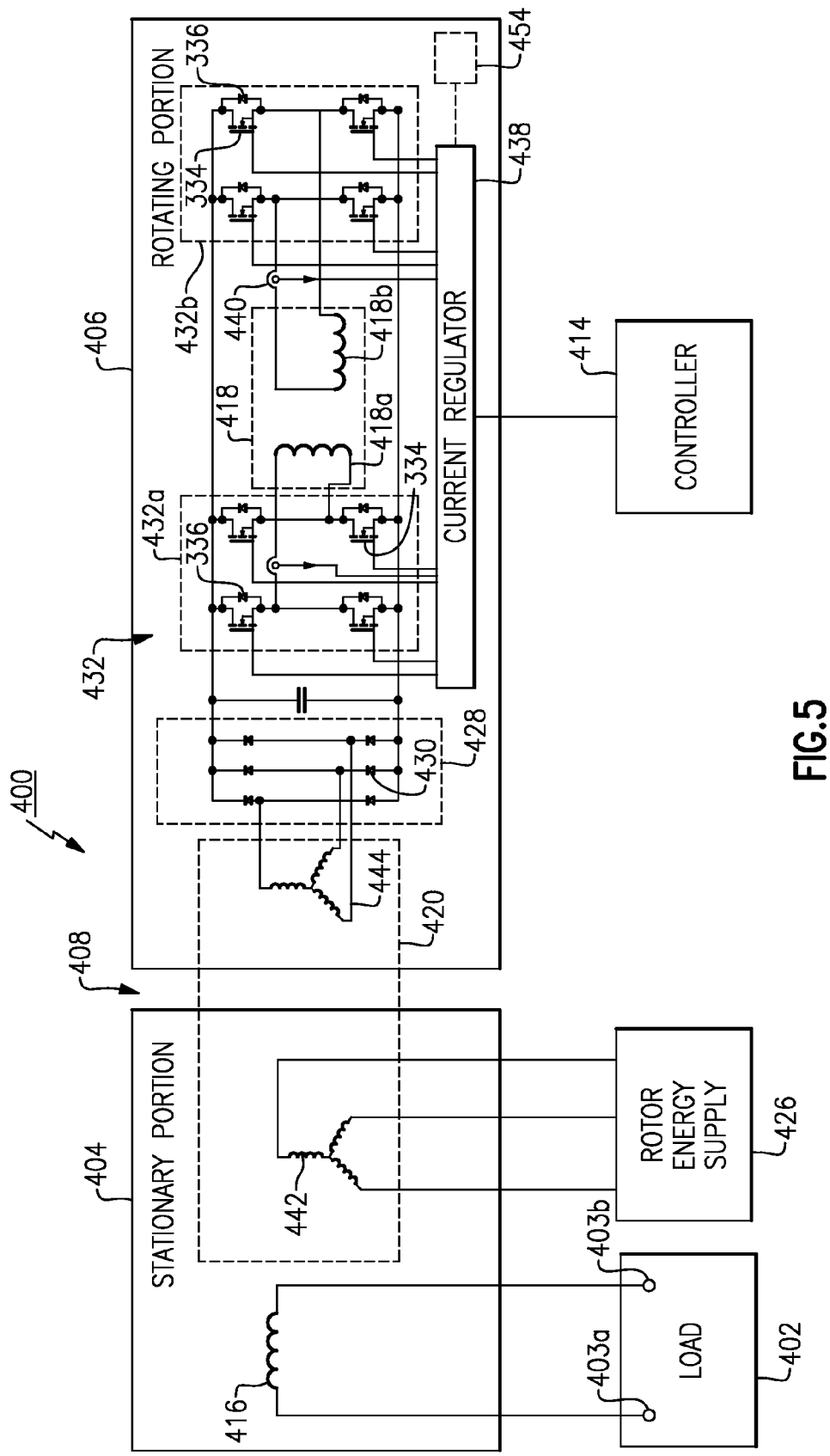
FIG. 5 schematically illustrates a fourth embodiment of a DC synchronous machine.

FIG. 5 schematically illustrates a fourth embodiment of a DC synchronous machine 400 configured to generate a rotating magnetic field based on two-phase current. In this embodiment, AC field winding 418 is a two-phase winding which can include a direct winding 418a and a quadrature winding 418b. A rotating inverter 432 can include two H-bridge circuits 432a, 432b coupled to direct winding 418a and quadrature winding 418b. The H-bridges 432a, 432b can include transistor(s) 434 and diode(s) 436 configured to selectively provide a supply of alternating current to the AC field windings 418 which is phase shifted by 90 electrical degrees. The field current causes a rotating magnetic field between the AC field winding 418 and stator armature winding 416 in order to induce direct current in the stator armature winding 416.

The embodiments 200, 300, 400 of a DC synchronous machine in utilize synchronization techniques described above with reference to FIG. 2. These include synchronization of the frequency of supply current with the rotor position utilizing one or more positions sensors to determine rotor position, or synchronization of the frequency of supply current with the rotor position utilizing various electrical parameters, such as voltage, detected at various locations within the DC synchronous machine to determine rotor position as described above. While exact synchronization is preferable, this disclosure extends to attempting to approach synchronization in the disclosed manner.

Although the different examples have a specific component shown in the illustrations, embodiments of this disclosure are not limited to those particular combinations. It is possible to use some of the components or features from one of the examples in combination with features or components from another one of the examples. It should also be understood that any particular quantities disclosed in the examples herein are provided for illustrative purposes only.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

We claim:

1. A synchronous machine comprising:
   a stationary portion including an armature winding;
   a rotating portion including a rotating inverter coupled to a field winding, the field winding including a direct winding and a quadrature winding separated from the armature winding to define an air gap; and
   wherein the rotating inverter is configured to communicate current to the field winding such that a frequency of the current is adjusted to approach synchronization with a position of the rotating portion;
   wherein the field winding is a two-phase field winding, the rotating inverter includes two H-bridges, one of the two H-bridges is coupled to the direct winding, and another one of the two H-bridges is coupled to the quadrature winding.

2. The synchronous machine as recited in claim 1, comprising a rotor energy source configured to supply current to the rotating inverter.

3. A synchronous machine comprising:
   a stationary portion including an armature winding;
   a rotating portion including a rotating inverter coupled to a field winding, the field winding including a direct winding and a quadrature winding separated from the armature winding to define an air gap; and
   wherein the rotating inverter is configured to communicate current to the field winding such that a frequency of the current is adjusted to approach synchronization with a position of the rotating portion;
   a rotor energy source configured to supply current to the rotating inverter; and
   wherein the rotor energy source is a rechargeable power source.

4. The synchronous machine as recited in claim 2, wherein the rotor energy source is one of a synchronous exciter, and a high frequency power transformer.

5. The synchronous machine as recited in claim 4, wherein the rotating portion includes a rotating rectifier coupling the rotor energy source to the rotating inverter.

6. A method for generating output from a synchronous machine, comprising:
   generating a rotating magnetic field between an field winding and an armature winding in response to communicating current from a rotating inverter to the field winding, the field winding including a direct winding and a quadrature winding; and
   adjusting a frequency of the current to approach synchronization with a position of a rotating portion of the synchronous machine;
   wherein the field winding is a two-phase field winding; and
   wherein the rotating inverter includes a first H-bridge coupled to the direct winding and a second H-bridge coupled to the quadrature winding.

7. The method of claim 6, further comprising:
   supplying power from a rotor energy source to the rotating inverter; and
   wherein the rotor energy source is one of a synchronous exciter, a high frequency power transformer, and a rechargeable power source.

8. The method of claim 7, wherein the rotor energy source and the rotating inverter are coupled to a rotating rectifier.

9. The synchronous machine as recited in claim 1 comprising a rotor energy source configured to supply current to the rotating inverter, wherein the rotating portion includes a rotating rectifier coupling the rotor energy source to the rotating inverter.

10. The method of claim 7, further comprising:
    supplying power from a rotor energy source to the rotating inverter; and wherein the rotating portion includes a rotating rectifier coupling the rotor energy source to the rotating inverter.

11. The synchronous machine as recited in claim 2, wherein the rotor energy source is a rechargeable power source.

12. The method of claim 7, wherein the rotor energy source is a rechargeable power source.

13. The method of claim 8, wherein the rotor energy source is a rechargeable power source.

14. synchronous machine as recited in claim 9, wherein the rotor energy source is a rechargeable power source.

15. The method of claim 10, wherein the rotor energy source is a rechargeable power source.

* * * * *

UNITED STATES PATENT AND TRADEMARK OFFICE
CERTIFICATE OF CORRECTION

PATENT NO. : 10,075,106 B2  
APPLICATION NO. : 14/683468  
DATED : September 11, 2018  
INVENTOR(S) : Gregory I Rozman, Jacek F. Gieras and Steven J. Moss Page 1 of 1

It is certified that error appears in the above-identified patent and that said Letters Patent is hereby corrected as shown below:

In the Claims

In Claim 6, Column 5, Line 42; replace "between an field" with --between a field--

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*